(12) United States Patent
Knittel et al.

(10) Patent No.: US 9,134,159 B2
(45) Date of Patent: Sep. 15, 2015

(54) AIR MASS METER

(75) Inventors: Thorsten Knittel, Pentling (DE);
Stephan Schürer, Regensburg (DE)

(73) Assignee: Continental Automotive GmbH,
Hannover (DE)

( * ) Notice: Subject to any disclaimer, the term of this patent is extended or adjusted under 35 U.S.C. 154(b) by 275 days.

(21) Appl. No.: 13/641,679

(22) PCT Filed: Apr. 12, 2011

(86) PCT No.: PCT/EP2011/055669
§ 371 (c)(1),
(2), (4) Date: Oct. 17, 2012

(87) PCT Pub. No.: WO2011/128315
PCT Pub. Date: Oct. 20, 2011

(65) Prior Publication Data
US 2013/0031959 A1    Feb. 7, 2013

(30) Foreign Application Priority Data

Apr. 16, 2010   (DE) .................. 10 2010 015 522

(51) Int. Cl.
*G01F 1/684*    (2006.01)
*G01F 1/692*    (2006.01)
*G01F 1/696*    (2006.01)
*G01F 5/00*    (2006.01)

(52) U.S. Cl.
CPC .............. *G01F 1/692* (2013.01); *G01F 1/684* (2013.01); *G01F 1/6845* (2013.01); *G01F 1/696* (2013.01); *G01F 5/00* (2013.01)

(58) Field of Classification Search
CPC ....... G01F 1/692; G01F 1/684; G01F 1/6845; G01F 1/696
See application file for complete search history.

(56) References Cited

U.S. PATENT DOCUMENTS

| 5,404,753 A | 4/1995 | Hecht et al. |
| 5,415,029 A | 5/1995 | Uchiyama et al. |
| 5,723,784 A | 3/1998 | Lembke et al. |
| 5,942,683 A | 8/1999 | Aoi et al. |
| 6,176,131 B1 | 1/2001 | Hecht et al. |
| 2002/0092349 A1 | 7/2002 | Watanabe et al. |

FOREIGN PATENT DOCUMENTS

| CN | 1157913 | 8/1997 |
| DE | 42 19 454 | 12/1993 |
| DE | 195 24 634 | 1/1997 |

(Continued)

OTHER PUBLICATIONS

Euisik Yoon et al. "An Integrated Mass Flow Sensor with on-chip CMOS Interface Circuitry" IEEE Transactions on Electron Devices, IEEE Service Center, Jun. 1, 1992 XP000271785.

*Primary Examiner* — Paul West
(74) *Attorney, Agent, or Firm* — Cozen O'Connor

(57) ABSTRACT

An air mass meter having a sensor chip. The sensor chip is constructed as a microelectromechanical system and has a sensor element, an electronic evaluation circuit and an electronic oscillator. The sensor chip is fastened to a carrier element using an adhesive. In order to specify an air mass meter which makes it possible to evaluate data in a particularly reliable and accurate manner, the sensor chip is divided into a first region and a second region. The sensor chip is fastened to the carrier element using the adhesive solely in the first region, and the sensor element and the oscillator are arranged in the second region.

13 Claims, 2 Drawing Sheets

(56) References Cited

FOREIGN PATENT DOCUMENTS

| | | |
|---|---|---|
| DE | 197 24 659 | 12/1997 |
| DE | 197 44 997 | 4/1999 |
| DE | 101 35 142 | 10/2002 |
| EP | 0 561 365 | 3/1993 |
| JP | 05-264314 | 10/1993 |
| JP | 09-26343 | 1/1997 |
| JP | 2000-146654 | 5/2000 |
| JP | 2008-20193 | 1/2008 |

AIR MASS METER

CROSS REFERENCE TO RELATED APPLICATIONS

This is a U.S. national stage of application No. PCT/EP2011/055669, filed on 12 Apr. 2011. Priority is claimed on German Application No. 10 2010 015 522.5, filed 16 Apr. 2010, the content of which is incorporated here by reference.

BACKGROUND OF THE INVENTION

1. Field of the Invention

The invention relates to an air mass meter with a sensor chip, wherein the sensor chip is constructed as a microelectromechanical system and comprises a sensor element, an electronic evaluation circuit, and an electronic oscillator, wherein the sensor chip is attached to a carrier element with an adhesive.

2. Description of Prior Art

Air mass meters are suitable for recording a mass flow of a fluid in a flow channel. A flow channel of this type can be an induction tract of an internal combustion engine. Diagnoses can be carried out on the operation of the internal combustion engine, and also control of the internal combustion engine can be carried out, depending on the mass flow recorded by the air mass meter. For this purpose, reliable and high precision recording of the current mass flow is important under various operating conditions.

DE 197 24 659 A1 discloses a mass flow sensor device, which comprises a sensor element. The sensor element is disposed and integrated on a separate chip. Furthermore, evaluation electronics are disclosed, which are constructed separately, but are electrically coupled to the sensor unit. DE 101 35 142 A1 discloses a mass flow sensor device with a housing body in which a sensor element of a mass flow sensor is disposed. The housing body comprises an input portion, from which a medium flow flows into a measurement duct, in which the sensor element is disposed. Furthermore, the housing body comprises a discharge opening, from which liquid particles and solid particles flow and so flow past the measurement duct.

SUMMARY OF THE INVENTION

An object of the invention is an air mass meter that enables a particularly reliable and accurate data evaluation.

One embodiment of the invention is characterized in that the sensor chip is divided into a first region and a second region. Attachment of sensor chip to the carrier element with the adhesive takes place exclusively in the first region and the sensor element and the oscillator are disposed in the second region. The bonding of the sensor chip to the carrier element results in a first region in which enormous material stresses can occur as a result of thermal influences. The different coefficients of thermal expansion of the material of the carrier element and of the sensor chip lead to material stress act in particular on certain electronic circuits. Because the oscillator and the sensor element are disposed in the second region, they are not affected by the thermal material stress. Hence the oscillator is particularly stable, resulting in a high quality time standard being available for data processing. In addition, the sensor element is protected by its stress-free arrangement against mechanical loads, which increases its service life and allows particularly accurate measurement of a mass flow.

In an advantageous embodiment, the carrier element is constructed as a stamped sheet metal part. Stamped sheet metal parts are also known as lead frames and they are widely used as a result of their favorable production costs. Stamped sheet metal parts have proved especially favorable, especially as carriers for sensor elements and electronic circuits for the automobile industry.

In a further advantageous embodiment, the sensor element is in the form of a membrane. A first and a second temperature sensor and a heating element can be formed on the membrane. A sensor element designed in this manner has particularly good sensor characteristics. The air masses flowing past the sensor can be detected very accurately and rapidly with this sensor element.

BRIEF DESCRIPTION OF THE DRAWINGS

Example embodiments of the invention are explained in detail below using the figures. Elements of the same design or function are characterized in all the figures with the same reference numbers. In the figures.

DETAILED DESCRIPTION OF THE PREFERRED EMBODIMENTS

Figure 1:
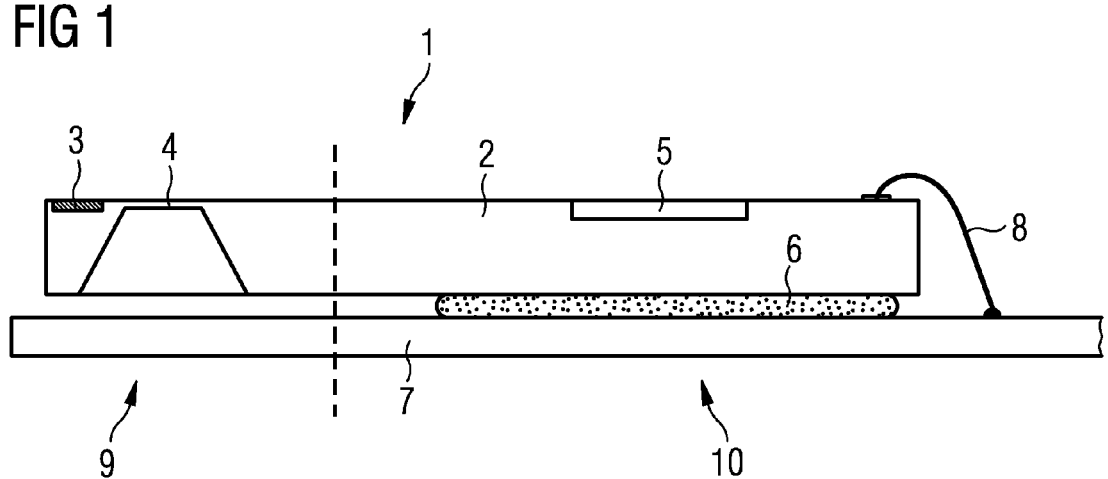
FIG. 1 is a lateral view of an air mass meter.

FIG. 1 shows an air mass meter 1 with a sensor chip 2 and a carrier element 7. The carrier element 7 can be in the form of a lead frame. The sensor chip 2 comprises evaluation electronics 5, a sensor element 4 and an oscillator 3. The sensor element 4 can be attached as a membrane to the sensor chip 2 by a micromechanical processing method. The oscillator 3 is in the form of an electronic circuit and provides precise and accurate data processing. Here it is important that the oscillator 3 oscillates with a very accurate and always constant frequency. The sensor chip 2 is mounted on the carrier element 7 with an adhesive 6. The carrier element 7 can, for example, be made of metal and the sensor chip 2 consists of silicon.

Metals and silicon have different coefficients of thermal expansion, which can lead in the case of a temperature change to a mechanical stress on the sensor chip 2 in the first region 10. This mechanical stress can have a detrimental effect on the operation of the electronic circuits. The sensor chip 2 comprises a second region 9, which is stress-free, because it does not have an adhesive connection to the carrier element 7. Both the oscillator 3 and the sensor element 4 are formed in this second region. The arrangement of the sensor element 4 and the oscillator 3 in the stress-free second region 9 leads to a very accurate measurement result of the air mass meter 1. The oscillator 3 can oscillate with a precisely determined and constant frequency, and the electronic components mounted in the sensor element 4 are not mechanically loaded, as a result of which particularly accurate detection of the air mass flow can occur.

Furthermore, in FIG. 1 bonding wires 8 can be seen, which electrically connect the sensor chip 2 to the carrier element 7. Via the carrier element 7, which for example can be in the form of a lead frame, a connection can be made to the downstream electronics in the motor vehicle. This can be an engine controller.

Figure 2:
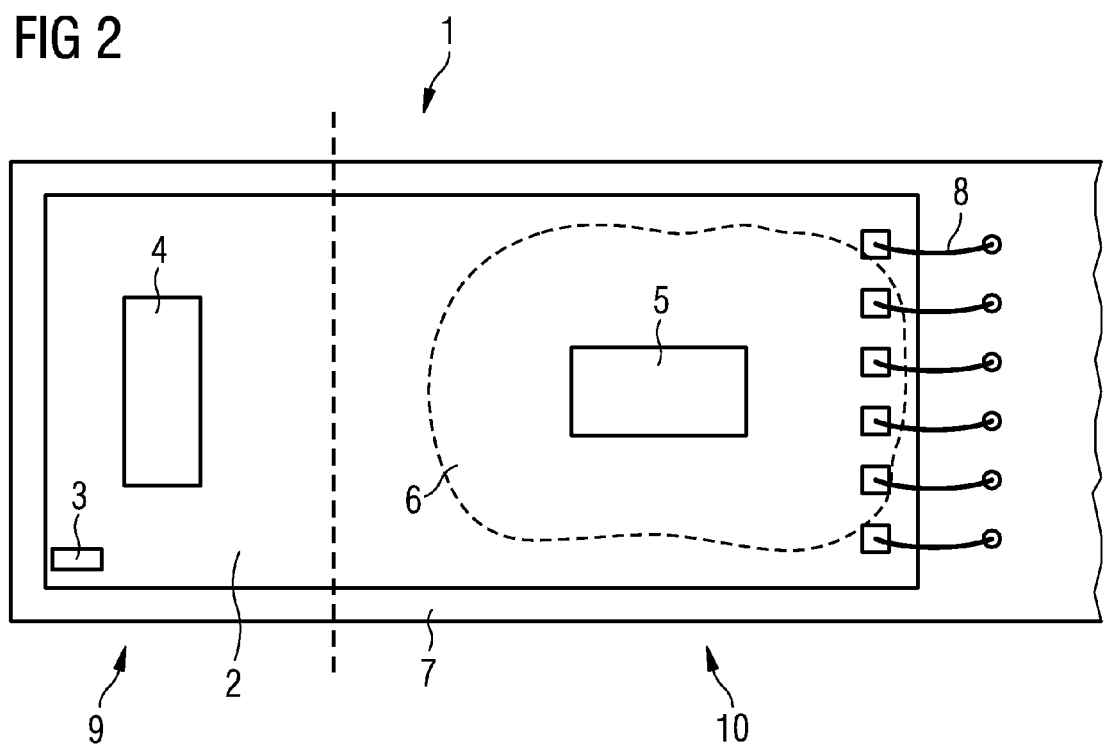
FIG. 2 is a plan view of the air mass meter known from FIG. 1.

FIG. 2 is a plan view of the air mass meter 1 known from FIG. 1. It shows the sensor chip 2 with the oscillator 3, the sensor element 4 and the evaluation electronics 5. The adhesive 6, which connects the sensor chip 2 to the carrier element 7, is shown below the evaluation electronics 5. As a result of the connection between the sensor chip 2 and the carrier element 7 with the adhesive 6, there is a first region 10, which is loaded by mechanical stress because of temperature changes. The oscillator 3 and the sensor element 4 are disposed in a second region 9, which is completely stress-free. Moreover, the bonding wires 8 can be seen, which electrically connect the sensor chip to the carrier element 7.

Figure 3:
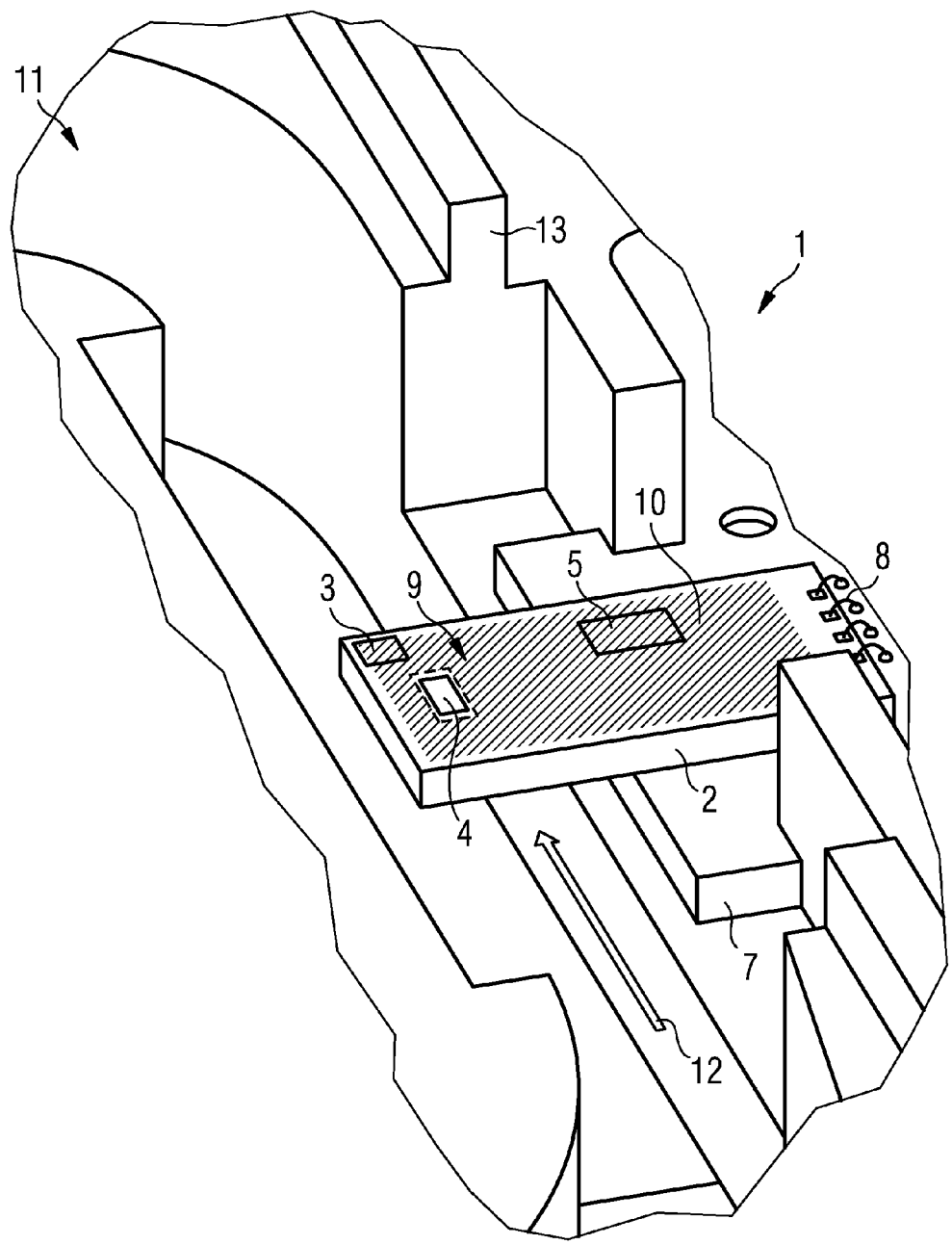
FIG. 3 is the air mass meter from FIGS. 1 and 2 in its installation position in a flow channel.

An air mass meter 1 is illustrated in FIG. 3, which, for example, can be disposed in a motor vehicle. The air mass meter 1 is disposed in a flow channel 11 in which a fluid flow, e.g. an air flow, can be deployed. The flow channel 11 is, for example, formed as a bypass channel of a housing body 13, which is preferably disposed downstream of an air filter in an induction tract of an internal combustion engine of the motor vehicle. The flow channel 11 is delimited by an upper channel wall 10 and a lower channel wall of the bypass channel 13. The housing body 13 is typically constructed to supply a portion of the air flow into the induction tract over a predetermined course of the bypass channel of the air mass meter 1, without carrying with it larger particles, e.g. sand particles or dust particles. Such particles can damage the air mass meter 1 and render it unusable.

A predetermined flow direction of the fluid flow in the flow channel 11 is illustrated in FIG. 3 by an arrow 12.

The sensor chip 2 of the air mass meter 1 is preferably in the form of a microelectromechanical system (MEMS). Evaluation electronics 5, a sensor element 4 and an oscillator 3 are integrated on the sensor chip 2.

The sensor element 4 comprises a self-supporting membrane, which, for example, is in the form of a silicon nitride and/or silicon oxide layer and, for example, has a membrane thickness of 5 $\mu m$. The membrane is disposed in a frame of the sensor chip 2. The production of the membrane takes place, for example, by etching a silicon wafer, which is coated with the silicon nitride and/or silicon oxide layer. A first and a second temperature sensor and a heating element, for example, are mounted on the membrane. The first and second temperature sensors are, for example, in the form of thermoelements, each of which provides a respective voltage based on the Seebeck effect, which is representative of a respective temperature, which is detected by the respective temperature sensor. In principle, other embodiments of the first and second temperature sensors known to experts are also possible, e.g. temperature-dependent resistances. The heating element is, for example, in the form of a resistance element, which is preferably disposed on the membrane along a central longitudinal axis of the air mass meter 1. The resistance element comprises at least one conducting track, which heats the membrane as a result of a current flow through the at least one conducting track. Preferably, the first and second temperature sensors are disposed on a surface of the membrane, on which the heating element is also disposed. The first and second temperature sensors are disposed laterally from the heating element on different sides of the heating element.

The air mass meter 1 is preferably disposed in the flow channel 11 in such a way that a surface of the sensor chip 2, on which the sensor element 4 and the evaluation electronics 5 are disposed, is oriented essentially parallel to the flow direction of the fluid flow.

The evaluation electronics 5 are designed, depending on the respective available voltage of the first and second temperature sensors and the detected temperature represented by them, to determine a temperature difference and, depending thereupon, to provide a sensor signal to a connection on the output side, which is integrated on the sensor chip 2. The sensor signal is representative of a mass flow of the fluid flow through the flow channel 11. The connection can, for example, be in the form of a bond pad, which with bond wires 8 enables an electrical connection to the carrier element 7 and thus to the downstream vehicle electronics.

The evaluation electronics 5 can be coated on the sensor chip S at least in portions with a protective layer C, to prevent damage by dirt particles in the air flow. Preferably, only the portion of the evaluation electronics 5 is coated with the protective layer, which is directly exposed to the fluid flow in the flow channel FC, especially during the operation of the internal combustion engine of the motor vehicle. Alternatively, however, the entire portion of the evaluation electronics 5 on the sensor chip 2 can be coated with the protective layer. The protective layer is applied to the sensor chip 2 in such a manner that the sensor element 4 is not coated.

The protective layer is preferably a polyimide layer applied during a production step of the mass flow sensor LMM, which is manufactured in MEMS process steps, on the corresponding portion of the sensor chip 2. Before the application of the protective layer, the mass flow sensor LMM is preferably already populated or manufactured and/or already able to be used for detecting the mass flow. For example, a polyimide resin can be dissolved in a solvent and sprayed onto the corresponding portions of the sensor chip 2. Then the solvent evaporates and the reaction takes place in the prepared polyimide layer by heating of the sensor chip S. For example, a layer thickness of 5 $\mu m$ is applied, in order to ensure adequate protection against particles and moisture in the fluid flow. Initially, the whole sensor chip 2 can be subjected to the polyimide layer and in a subsequent production step the polyimide layer can be selectively removed from the portion of the sensor element 4 and any further portions of the sensor chip 2. Alternatively, the polyimide layer can be selectively applied to the sensor chip 2 in a single production step, wherein at least the portions of the sensor element 2 can be omitted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air mass meter comprising:
a carrier element;
a sensor chip having a first region proximate to a first end of the sensor chip and a second region proximate to a second end of the sensor chip longitudinally opposite the first end, the sensor chip comprising:
a sensor element arranged in the second region of the sensor chip;
an electronic evaluation circuit arranged exclusively in the first region of the sensor chip; and
an electronic oscillator arranged in the second region of the sensor chip; and an adhesive, the adhesive:
arranged on a first face of the sensor chip opposite a second face of the sensor chip on which the electronic evaluation circuit is arranged;
covering the entirety of the portion of the first face of the sensor chip that is directly opposite to the area occupied by the electronic evaluation circuit on the second face, to attach the carrier element to the sensor chip exclusively in the first region of the sensor chip; and
arranged between the carrier element and the sensor chip exclusively in the first region of the sensor chip.

2. The air mass meter as claimed in claim 1, wherein the carrier element is a stamped sheet metal part.

3. The air mass meter as claimed in claim 2, wherein the sensor element is a membrane.

4. The air mass meter as claimed in claim 3, wherein a first temperature sensor, a second temperature sensor, and a heating element are formed on the membrane.

5. The air mass meter as claimed in claim 1, wherein the sensor element is a membrane.

6. The air mass meter as claimed in claim 5, wherein a first temperature sensor, a second temperature sensor, and a heating element are formed on the membrane.

7. The air mass meter as claimed in claim 5, wherein the membrane is one of a silicon nitride and a silicon oxide layer.

8. The air mass meter as claimed in claim 7, wherein the membrane is 5 µm thick.

9. The air mass meter as claimed in claim 1, wherein the sensor chip is constructed as a microelectromechanical system.

10. The air mass meter as claimed in claim 1, further comprising:
a coating on the sensor chip covering at least part of the electronic evaluation circuit.

11. The air mass meter as claimed in claim 10, wherein the sensor element is not covered by the coating.

12. The air mass meter as claimed in claim 10, wherein the coating is 5 µm thick.

13. The air mass meter as claimed in claim 1, further comprising:
a coating on the sensor chip covering the entirety of the electronic evaluation circuit.

* * * * *